INVENTOR.
DALPH C. McNEIL
BY Green, McCallister & Miller
HIS ATTORNEYS

Nov. 22, 1966  D. C. McNEIL  3,287,616
SOLENOID MOTOR

Filed Aug. 12, 1963  2 Sheets-Sheet 2

INVENTOR.
DALPH C. McNEIL
BY Green, McCallister &
Miller
HIS ATTORNEYS

United States Patent Office 3,287,616
Patented Nov. 22, 1966

3,287,616
SOLENOID MOTOR
Dalph C. McNeil, 43 Pine St., Brookville, Pa.
Filed Aug. 12, 1963, Ser. No. 301,432
7 Claims. (Cl. 318—37)

This invention relates to an electrically operated stroke motor that can be used wherever existing stroke motors are employed for providing either reciprocating motion or linear positioning. Furthermore, the stroke motor of this invention can be used more conveniently than existing fluid motors since no auxiliary power supply other than an electrical wall outlet is required.

Existing electric stroke motors, such as there are, are very limited as to practical use. For short stroke requirements, it is common to employ a plunger that is moved by a single or a double solenoid depending upon whether powered reversal is required. The stroke of such arrangement is limited to substantially half the length of the solenoid or solenoids. Also, the available motive force is limited by the permissive diameter of the solenoids. It will be appreciated that space considerations as well as the cost of producing very long or heavy solenoids places a practical limit on the uses to which such devices may be put. Electric stroke motors capable of relatively long strokes are somewhat more complicated and employ a rotating motor and some motion converting means, such as a crank shaft or a screw jack, for producing a linear or stroke type output. These systems serve certain stroke functions adequately. However, their versatility is limited by mechanical transforming characteristics which makes it rather difficult to attain a rapid acting, positive positioning stroke.

There is often a need for compact, long stroke actuators requiring a minimum of ancillary equipment. This need is felt in many different fields; however, it is particularly pressing in the field of business machines and other mechanical sorting or computing devices. Business machines require stroke actuators that are capable of moving rapidly to any of several positions. Electrically operated reciprocating motors also find various uses such as actuating doors or continuously moving parts of advertising display signs.

Accordingly, it has been an object of my invention to investigate the theoretical and practical problems encountered in constructing electrically operating stroke motors;

Another object of my invention has been to devise an electrically operated stroke motor that can as a practical matter be constructed to have any desired stroke and still make efficient use of the space consumed;

Another important object of my invention has been to devise an electric stroke motor that is capable of continuous reciprocation through a stroke that is at least as long as or longer than the motive force creating mechanism;

A further object of my invention has been to provide an electric stroke motor that is capable of being controlled to positively position an output in any of several preselected positions;

These and other objects of my invention will become more apparent to those skilled in the art upon reading and understanding the following description of the inventive concepts upon which my invention is based, some specific illustrative embodiments thereof, and the appended claims.

One phase of my invention relates to the use of sequentially operated serially-axially aligned solenoids which provide an extended range of electro-magnetic force. It is thus possible to achieve a magnetically induced mechanical stroke throughout a distance substantially equal to the entire length of the series of solenoids. A magnetic or magnitizable plunger or armature is positioned with the common hollow core of the solenoids and is adapted to move along the length thereof. Preferably the plunger has a length of from one to two times the length of one solenoid whereby two solenoids can exert magnetic force on it simultaneously. Sequential operation of the solenoids is attained by providing a switching control that is operated in response to the position of the plunger relative to the solenoids. The switching control anticipates the position of the plunger within the series and thus creates a moving magnetic field that leads or is one step ahead of the plunger. While various known switching structures can be employed to operate the solenoids, I prefer to use a series of track-type contacts that are sequentially engaged by a follower which is operatively connected to the plunger so as to sense or be responsive to its position at all times. The contacts of my preferred embodiments are partially overlapped (but mutually insulated) so that the follower will provide a smoothly moving field of magnetic force by energizing the next succeeding solenoid before de-energizing a currently operating solenoid. The solenoids are connected in parallel to the power source such that each solenoid will receive an equal and constant voltage even when two solenoids are simultaneously energized.

Another important phase of my invention involves the use of a pair of iron annular members such as washers which are positioned adjacent opposed axial ends of each individual solenoid to concentrate the solenoid's magnetic flux. I have found that the use of such washers with the resultant sharp definition of magnetic force serves to concentrate the magnetic field as it moves, to provide more positive action. Also, the concentration of the magnetic field provided by the washers, serves to more positively position the plunger within any given individual solenoid when positive positioning is desired.

Another important phase of my invention involves the use of an automatcally operated reversing control by which it is possible to obtain continuous reciprocation of the motor. My basic motor concept lends itself readily to continuous reciprocation in that it is necessary only to reverse the lead of the moving magnetic field by re-associating with the switch contacts to cause a reversal in the movement of the plunger. Means for sensing the end positions of the stroke are provided for operating ganged switches to simultaneously re-associate the switches and the solenoids. While there are many ways of operating the ganged switches, a preferred embodiment of my invention employs a pair of reversing solenoids that operate on a ganging lever to move the switches between two operative positions. A spring-loaded toggle or equivalent holding mechanism is provided to hold the ganging lever in either of its two operative positions, as determined by the reversing solenoids. For a completely electrical switching arrangement it is a simple matter to provide an appropriate holding circuit to maintain the gang switch in one position throughout one stroke and to hold the gang switch in its reversed position throughout the reverse stroke.

A further phase of my invention relates to a simple switching control for causing the motor to move to a desired pre-determined position along its stroke. This function is particularly useful in business machines where it is desired to mechanically locate a particular bit of information. It will be appreciated that to locate the plunger within any given solenoid, it is necessary merely to reverse the lead of the output position sensing switches associated with the solenoids beyond the desired solenoid position.

A further important phase of my invention involves the multiplication of force and stroke characteristics while maintaining minimum space consumption. I have found that by employing two or more spaced plungers and simultaneously energizing a pair of space solenoids, it is possible to double the motive force without varying the motor diameter. Also, it is possible to substantially increase the stroke length well beyond the length of the solenoids by passing each of the spaced plungers through the entire series of solenoids. The control or solenoid energization mechanism for the force and stroke multiplication modification is basically the same as that previously described, any specific differences being matters requiring only engineering skill.

A further phase of my invention relates to a modified stroking means that is particularly useful where more than one plunger is employed to achieve a multiplied stroke. The modified stroking means comprises a cylindrical walled rigid tube containing one or more magnetic masses that serve the function of the previously described plunger. The cylindrical wall of the tube permits the use of supporting bearings wherever required, without concern for enlarged sections.

These phases or inventive concepts of my invention are exemplified and more fully explained in the following description of a specific illustrative embodiment of my invention, wherein reference is made to the accompanying drawings, of which:

Figure 1:
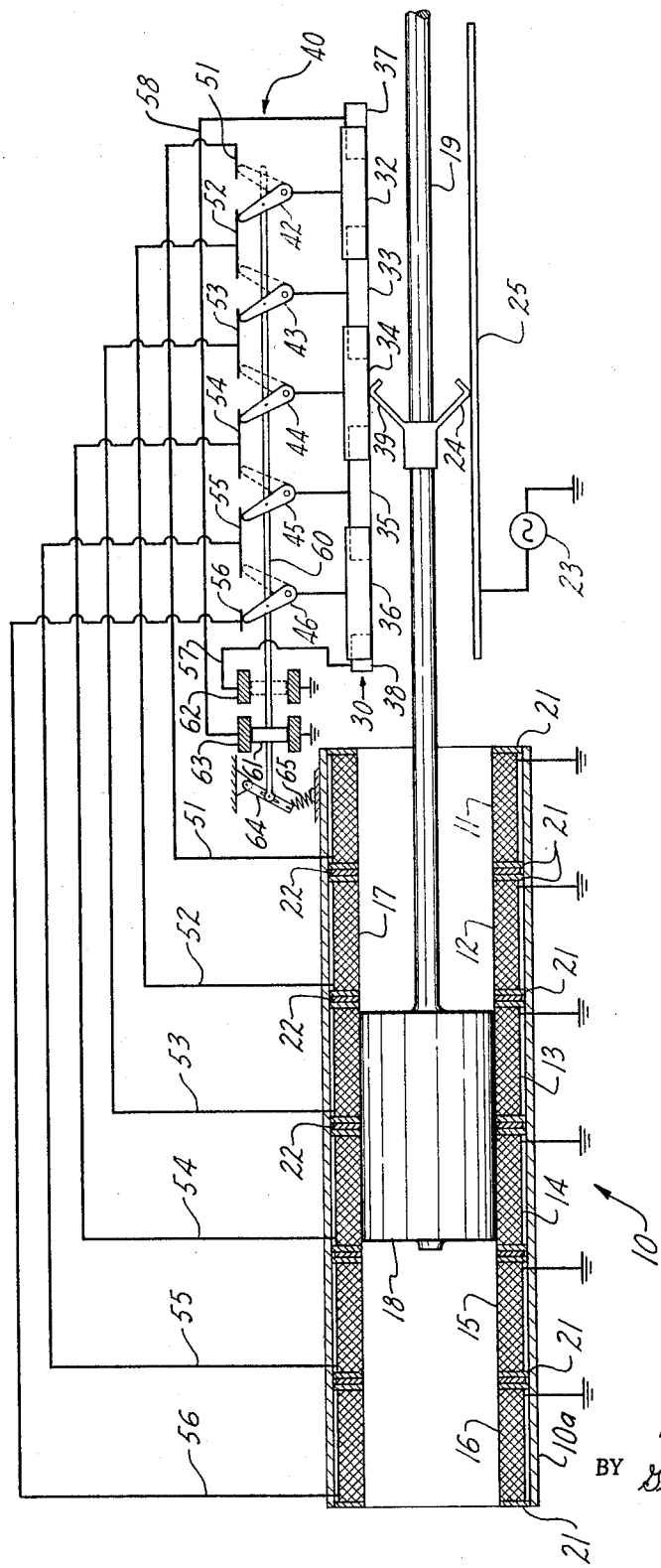
FIGURE 1 is a somewhat diagrammatic view of a reciprocating motor embodying several of the novel concepts of my invention.
Figure 3:
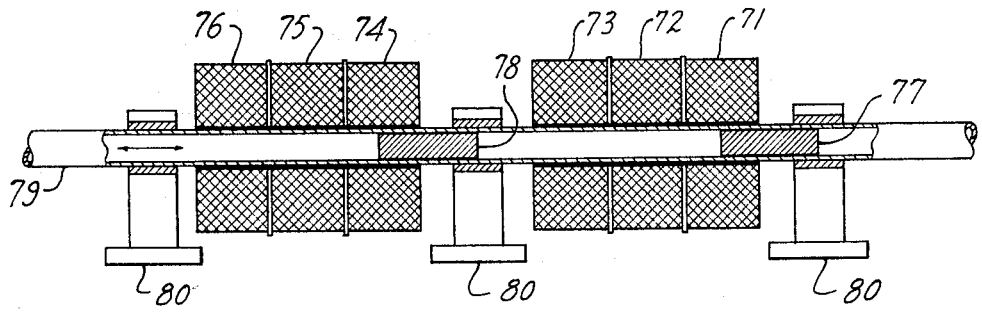

And, FIGURE 3 is a partial diagrammatic view of a modified form of the motor shown in FIGURE 1.

More specifically, in FIGURE 1 there is shown a stroke motor 10 having a housing or casing 10a that is preferably composed of a magnetic or magnetizable material, such as soft iron which provides a good path for magnetic flux. Within the housing 10a is contained a plurality of serially-axially aligned coils or solenoids 11, 12, 13, 14, 15 and 16. Each of the aligned coils 11 through 16 is in the form of an annulus to provide a common elongated hollow core, track or pathway 17 through which a stroking means can move.

The stroking means includes a piston-like member or plunger 18 which is composed of a magnetic or magnetizable material, such as soft iron, so as to be movable in response to the magnetic fields created by the solenoids 11 through 16. The plunger 18 preferably has a length of between one and two times the length of one solenoid so that the magnetic field from at least one solenoid can be operative to move the plunger at any given position thereof. The stroking means also includes a mechanical piston rod or output 19 that is securely connected to the plunger 18 and extends outwardly of the casing 10a to a position where it can be connected to any desired load.

The axial ends of each of the solenoids 11 through 16 are provided with soft iron washers or annular members 21 which serve to concentrate the magnetic flux of each individual solenoid about the axial ends of the solenoid so as to provide greater differentiation of the individual magnetic fields. The washers 21 associated with adjacent solenoids are mutually separated by an insulating or fabric annulus or washer 22.

I have determined that by proper energization of the solenoids 11 through 16, the plunger 18 can be caused to move through the length of the casing 10a.

Proper energization of the solenoids 11 through 16 is provided by the use of means responsive to the position of the plunger 18 for selectively energizing the solenoids to create a magnetic field that leads the plunger. The lead is such that as the center of gravity of the plunger 18 approaches the center of one of the solenoids 11 through 16, the next succeeding solenoid is energized. Similarly, each solenoid is de-energized just after the center of gravity of the plunger has passed the center of the solenoid.

The position responsive means comprises a first control 30 which, for purposes of illustration, is shown as a plurality of lead switching means provided by brush receiving members or contacts 32, 33, 34, 35, 36, 37, and 38. The contacts in the control 30 are engaged or operated by a leaf spring or sliding brush 39 that is mounted on or otherwise operatively connected to the output 19 so as to be positioned as a function of the position of the output and the plunger 18. The brush 39 is operatively connected to a source of electric power 23 by suitable means such as a pick-up brush 24 and an elongated supply contact 25.

It will thus be seen that as the output 19 is moved by the plunger 18, the brush 39 will sequentially engage the contacts 32 through 36 in the control 30. At the extreme ends of the stroke, contacts 37 and 38 will be engaged. As explained hereinafter in greater detail the contacts 32 through 36 are electrically connected to respective ones of said solenoids in a similarly oriented (each from left to right) sequence. Transversal by the brush 39 of the contacts 32 through 36 thus causes energization of the appropriate solenoids to create a magnetic field that leads the movement of the plunger 18.

To enhance the operation of the device, I prefer that adjacent switch contacts in the switch bank 30 be overlapped and mutually insulated (by conventional means not shown). This construction permits the brush 39 to simultaneously engage adjacent contacts and thereby simultaneously energize adjacent solenoids during periods of plunger transition therebetween. I have found that such arrangement enhances and insures the smooth operation of the device even when employed for moving high friction or low inertia loads.

Movement of the plunger 18 in a reverse direction is accomplished by reversal of the lead of the contacts 32 through 36 with respect to the position of the plunger 18. The lead of the contacts 32 through 36 is reversed by a switch bank 40 that contains a plurality of reversing switches 42, 43, 44, 45 and 46 each having two positions, as shown by the full and broken lines in FIGURE 1. Suitable electric conduits or wires 51, 52, 53, 54, 55 and 56 are employed to connect the reversing switches 42 through 46 to their appropriate solenoids.

The operation of the apparatus thus far described is as follows:

In the position shown, the brush 39 is engaging the contact 34 and switch 44 is electrically connected to wire 54 such that current from the source 23 is being supplied to the solenoid 14. As the center of gravity of the plunger 18 is positioned to the right-of-center of the solenoid 14, the magnetic flux of the solenoid is causing a leftward movement of the plunger 18. As the plunger moves leftward, the brush 39 will engage the contact 35 to supply current through the switch 45 and wire 55 to the solenoid 15 which will, in turn, induce an additional leftward force on the plunger 18. Continued leftward movement will move the brush 39 off-of the contact 34 thus de-energizing the solenoid 14 and removing any restraining force that would otherwise be exerted thereby.

On the other hand, when the switch bank 40 is in the broken line position and the plunger 18 is positioned, as shown, it will be apparent that current is being supplied through the brush 39, contact 34, switch 44 and wire 53 to solenoid 13 which will induce a rightward movement of the plunger 18. The rightward movement will cause sequential engagement of the contact 33 and further rightward movement in a manner similar to that previously described in connection with leftward movement.

Continuous reciprocation of the plunger 18 is accomplished by automatically repositioning the switch bank 40 each time the plunger reaches the extreme end of its stroke. For this purpose, an actuator bar or connecting rod 60 is connected to all of the reversing switches 42 through 46 to permit their simultaneous operation. A conventional solenoid actuator is provided for positioning said connecting rod as required. The actuator includes an enlarged magnetic or magnetizable section 61 that is mounted on the connecting rod 60 and is acted upon by either of a pair of solenoids 62 or 63. The solenoid 62 is energized as the plunger 18 comes to a position adjacent the lefthand end of its stroke wherein the center-of-gravity of the plunger 18 is approaching the center of the solenoid 16. In this position the brush 39 engages the contact 38 which supplies electric current to a conduit or wire 57 that is electrically connected to the solenoid 62. The solenoid 63 is energized when the plunger 18 approaches the righthand end of its stroke wherein the center-of-gravity of the plunger 18 is approaching the center of the solenoid 11. In this position the brush 39 engages the contact 37 which supplies current to a wire 58 that is connected to the solenoid 63. It is necessary to hold the switch bank 40 in either of its positions during intermediate positions of the plunger 18 and the brush 39. Accordingly, I provide a simple overcenter toggle having a pivoted toggle link 64, the pivotal motion of which is opposed by a compression spring 65 in a manner well known to those skilled in the art.

It will thus be seen that as the plunger 18 approaches its lefthand end position, the brush 39 will engage the contact 38 and energize the solenoid 62 to cause the switch bank 40 to shift to its broken-line position. In the broken-line position, the contact 36 is connected through the switch 46 to the wire 55 whereby solenoid 15 will be energized causing a rightward movement of the plunger 18. As mentioned above, the righthand movement will cause sequential engagement by the brush 39 of the contacts 35, 34, etc. until the brush 39 engages the contact 38. When the brush 39 engages the contact 38, the solenoid 63 will be energized causing the switch bank 40 to shift back to its full line position. Reversing switch 42 moves to energize the solenoid 12 again causing leftward movement of the plunger 18.

Figure 2:
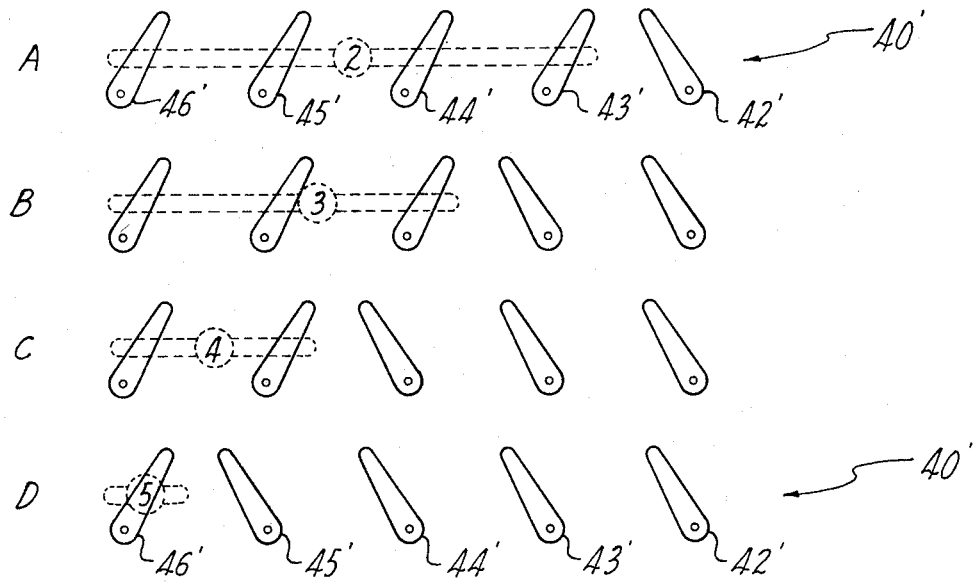
FIGURE 2 is a fragmental diagrammatic view showing a modification of the control switching that may be employed with the motor shown in FIGURE 1.

Turning now to FIGURE 2, there is shown schematically an alternate control for the motor of FIGURE 1 in four different control positions. The control shown in FIGURE 2 is useful wherever it is desired to move the output 19 (see FIGURE 1) to any given one of several pre-selected positions. The control shown in FIGURE 2 involves a modified switch bank 40' that is similar in electrical connections to the switch bank 40 shown in FIGURE 1.

The switch bank 40' includes a plurality of independently actuatable reversing switches 42', 43', 44', 45' and 46'. By shifting the appropriate switches in the bank 40', it is possible to cause the plunger 18 to move to a pre-selected position. For example, in FIGURE 2A, switches 43', 44', 45', and 46' have been shifted to their reverse position and both switches 42' and 43' are in electrical contact with the wire 52 which energizes the solenoid 12. If the plunger 18 is to the left of the solenoid 12, the switching sequence provided by the contacts 33, 34, 35 and 36 and the switches 43', 44', 45' and 46' is such as to cause rightward movement of the plunger 18 toward the solenoid 12. Since both contacts 32 and 33 are connected to the solenoid 12 and since the switches 43' and 42' are positioned to cause a rightward movement of the plunger 18, the plunger will stop and center itself within the solenoid 12. In this position, the brush 39 will be engaging the overlapped portion of contacts 32 and 33. On the other hand, if the plunger 18 were to the right of the solenoid 12, it would be induced to move leftward to the solenoid 12 by the switching sequences established by the switch 42'.

FIGURE 2B shows an arrangement of the reversing switches in the bank 40' for positioning the plunger 18 within solenoid 13. FIGURE 2C shows an arrangement of the switches in the bank 40' for positioning the plunger 18 within solenoid 14. FIGURE 2D shows an arrangement of the switches in the bank 40' for positioning the plunger 18 within solenoid 15. It is thus a simple matter to provide mechanical means, such as a keyboard (schematically indicated by key bars numbered 2, 3, 4, and 5 for the relative positions they represent) for selectively engaging one or more of the reversing switches in the bank 40' to select a desired position of the plunger 18 within one of the solenoids 11 through 16.

FIGURE 3 shows a modified embodiment of the basic concept of my invention. This embodiment is capable of producing a greater force, longer stroke or a combination of the two than the embodiment of FIGURE 1. In FIGURE 3, the solenoids are broken into two sets, 71, 72, and 73 and 74, 75, and 76. The stroking means includes two spaced magnetically permeable masses or plungers 77 and 78 which are supported within a rigid tube 79. The tube 79 is slidably supported by suitable bearing members 80 whereby both of the plungers 77 and 78 can move through the entire length of both sets of solenoids. It will be seen that by simultaneously energizing solenoids 71 and 74, that both plungers 77 and 78 will be forced to the left thereby doubling the available motive force within a constant solenoid diameter. It will also be seen that by proper construction and sequencing, the stroke available by this device extends from the position of plunger 77 in solenoid 76 to the position of plunger 78 in the solenoid 71. The control circuitry is of course similar to that shown in FIGURE 1, except for design changes which are well within ordinary engineering skill.

Those skilled in the art will appreciate that I have devised and disclosed herein a novel stroke type electric motor that is sufficiently versatile in its theoretical requirements as to permit the ready construction of continuously reciprocating motors, positive positioning motors and motors having extended force and stroke characteristics. While some preferred embodiments of my invention have been shown herein for purposes of illustration, it is to be understood that various changes may be made in this construction by those skilled in the art without departing from the spirit and disclosed concepts of my invention as particularly pointed out and defined in the appended claims.

I claim:
1. A reciprocating stroke motor apparatus having at least three serially-axially-aligned electric solenoids that surround a common hollow core and having a magnetizable plunger positioned within the hollow core and movable throughout the length of the solenoids and that operates solely on one potential side of a source of electric current to accomplish reciprocating movement of the plunger which comprises, a mechanical output means operatively-connected to said plunger for movement therewith, first switch means for the one potential side that is responsive to the position of said mechanical output means for selectively controlling the electrical energization of the solenoids, said first switch means having a plurality of individual electric lead switches that are serially arranged for sequential operation by said output means as a function of its position, second switch means for the one potential side that electrically-connects each of the lead switches of said first switch means to respective ones of said solenoids in a similarly oriented sequence whereby sequential operation of the lead switches of said first switch means will be associated with sequential positioning of the plunger within the hollow core, said second switch means having a plurality of electric reversing switches electrically-connected between the lead switches of said first switch means and the solenoids to provide selected association of the lead switches of said first switch means and said solenoids whereby at least two of the lead switches of said first switch means can be selectively electrically-connected to each one of a pair of adjacent solenoids, and operating means mechanically-connecting at least a pair of the reversing switches of said second switch means together for simultaneously moving them between a forward plunger movement inducing position and a backward plunger movement inducing position.

2. A reciprocating stroke motor apparatus as defined in claim 1 wherein all of the reversing switches of said switch means are mechanically-connected together by said operating means for simultaneous movement between forward and backward plunger movement inducing positions.

3. A reciprocating stroke motor apparatus as defined in claim 1 wherein, the lead switches of said first switch means include front and back end switches; a pair of electric actuator solenoids, one of which is electrically-connected with the front end switch and the other of which is electrically-connected with the back end switch; and said actuator solenoids are mechanically-connected to said operating means for moving it and the reversing switches between the forward and backward plunger movement inducing positions.

4. A reciprocating stroke motor apparatus as defined in claim 3 wherein, a second group of at least three serially-axially-aligned solenoids are provided that surround the same common hollow core, and a second magnetizable plunger is mechanically-connected with the first-mentioned plunger in a longitudinally-spaced relation therewith for movement within the hollow core throughout the length of the solenoids of said second group.

5. A reciprocating stroke motor apparatus as defined in claim 3 wherein, means electrically-connects one side of a source of electrical energy to one side of the axially-aligned solenoids and said actuator solenoids, and means electrically-connects the other side of the source of electrical energy through said first and said second switch means to the other side of the axially-aligned solenoids and said actuator solenoids.

6. A reciprocating stroke motor apparatus as defined in claim 3 wherein a holding mechanism is operatively-associated with said operating means for retaining it in the forward and backward positions when it has been moved to such positions by said actuator solenoids.

7. A reciprocating stroke motor apparatus as defined in claim 6 wherein said holding mechanism is a spring-loaded toggle.

References Cited by the Examiner
UNITED STATES PATENTS

| | | | |
|---|---|---|---|
| 424,535 | 1/1890 | Bock | 310—35 |
| 1,014,495 | 1/1912 | Lincoln | 310—35 |
| 1,050,960 | 1/1913 | Lincoln | 310—35 |
| 1,069,709 | 7/1913 | LeBlanc | 310—35 |
| 1,296,634 | 3/1919 | Guire | 310—35 |
| 1,909,470 | 5/1933 | Jacobson | 310—14 |
| 2,365,632 | 12/1944 | Fisher | 310—14 |
| 2,752,546 | 6/1956 | Frisch | 318—135 |

OTHER REFERENCES

Pender, H. and McIlwain, K.: Electrical Engineers Handbook, Third Edition, pages 2–53; John Wiley, New York, 1936.

MILTON O. HIRSHFIELD, *Primary Examiner.*
ORIS L. RADER, *Examiner.*
C. W. DAWSON, D. F. DUGGAN, *Assistant Examiners.*